(12) United States Patent
Ishibashi et al.

(10) Patent No.: US 7,467,412 B2
(45) Date of Patent: Dec. 16, 2008

(54) DATA TRANSFER SYSTEM, DATA TRANSFER PROGRAM AND VIDEO SERVER SYSTEM

(75) Inventors: Hiromichi Ishibashi, Ibaraki (JP); Yoshiaki Komma, Hirakata (JP)

(73) Assignee: Panasonic Corporation, Osaka (JP)

( * ) Notice: Subject to any disclaimer, the term of this patent is extended or adjusted under 35 U.S.C. 154(b) by 786 days.

(21) Appl. No.: 10/968,601

(22) Filed: Oct. 19, 2004

(65) Prior Publication Data

US 2005/0086505 A1 Apr. 21, 2005

(30) Foreign Application Priority Data

Oct. 20, 2003 (JP) .............................. 2003-358666
Oct. 27, 2003 (JP) .............................. 2003-365652

(51) Int. Cl.
G06F 7/04 (2006.01)
G06F 17/30 (2006.01)
G06K 9/00 (2006.01)
H03M 1/68 (2006.01)
H04K 1/00 (2006.01)
H04L 9/00 (2006.01)
H04L 9/32 (2006.01)
H04M 7/16 (2006.01)

(52) U.S. Cl. .............................. 726/26; 726/27; 726/31
(58) Field of Classification Search .................. 726/26, 726/27, 31
See application file for complete search history.

(56) References Cited

U.S. PATENT DOCUMENTS 6,449,514 B1 9/2002 Natsubori et al.
6,691,149 B1 2/2004 Yokota et al.
7,130,251 B1 * 10/2006 Morohashi et al. ....... 369/47.13

FOREIGN PATENT DOCUMENTS

| EP | 0 942 600 A2 | | 9/1999 |
| EP | 1 037 460 A2 | | 9/2000 |
| JP | 2000322826 A | * | 11/2000 |
| JP | 2001-268461 A | | 9/2001 |
| JP | 2002-077745 A | | 3/2002 |

* cited by examiner

Primary Examiner—Kambiz Zand
Assistant Examiner—James Turchen
(74) Attorney, Agent, or Firm—Panitch Schwarze Belisario & Nadel LLP

(57) ABSTRACT

A data transfer system transfers original data from a first data storage device to a second data storage device. The transfer system includes a compressor, an encryptor, and a controller. The compressor receives the original data from the first data storage device, generates compressed data of a smaller size, and passes the compressed data to the second data storage device. The encryptor makes a predetermined cryptographic key and passes the key to the second data storage device. The encryptor also receives the original data from the first data storage device, encrypts the original data with the cryptographic key and then sends the encrypted data back to the first data storage device. The controller controls the compressor and the encryptor and gives the first data storage device a first erase instruction, telling the first data storage device to erase the original data, in accordance with a first transfer command.

17 Claims, 3 Drawing Sheets

DATA TRANSFER SYSTEM, DATA TRANSFER PROGRAM AND VIDEO SERVER SYSTEM

BACKGROUND OF THE INVENTION

1. Field of the Invention

The present invention relates to a distributed video server system constructed by connecting together a plurality of video recorders, each including an optical disk recorder, through a network.

2. Description of the Related Art

Recently, videocassette recorders, which used to be dominating consumer audiovisual equipment, are gradually being replaced by optical disk recorders, which use a disk storage medium such as a recordable or rewritable DVD (which will be referred to herein as an "optical disk") to read and write audiovisual data therefrom/thereon by an optical technique. The optical disk has a planar data storage layer on which digital audiovisual data is stored. In performing a read or write operation on such an optical disk, an optical head can access any arbitrary location on the data storage layer in a matter of seconds. Accordingly, even if multiple titles of video data are stored on the same optical disk, any of those titles can be played back in a short time. Also, the optical disk as a storage medium is removable and exchangeable, and there is no storage capacity limit on the optical disk recorder itself. By making use of these advantageous features of the optical disk, various new technologies have been proposed.

For example, Japanese Laid-Open Publication No. 11-260043 proposes the technique of storing reserved program recording information on an optical disk. If the reserved program recording information is stored on a given optical disk, then an optical disk recorder reads that information and makes a timer reservation such that its built-in TV tuner and optical disk drive start writing the designated program at a preset time.

Even if the optical disk, from which the reservation information has been read, is removed from the optical disk recorder after the reservation has been done, that reservation information remains on that optical disk. Accordingly, if that optical disk is loaded into another optical disk recorder, that optical disk recorder can also read the reservation information from the optical disk and can make a reservation of a program to be written on the optical disk in accordance with the reservation information. According to this technique, a program to be recorded is reserved in accordance with the information stored on a given optical disk, and there is no need to make a reservation of the same program all over again if the optical disk is loaded into another optical disk recorder.

Meanwhile, optical disks have also been used as computer data storage media, not just as audiovisual data storage media, and contribute immensely to allowing the user to exchange data with a computer system easily. Thus, Japanese Laid-Open Publication No. 12-90575 proposes that a number of optical disk recorders be used as a so-called "distributed server" by using optical disks as removable high-capacity storage media and by connecting the optical disk recorders with those disks together through a network. Furthermore, Japanese Laid-Open Publication No. 13-268461 discloses a system, which is specially designed to record multiple telecasts on different channels simultaneously by using the tuner of another unit included in the same network.

Furthermore, Japanese Laid-Open Publication No. 12-322826 proposes that digital audio or video data to be moved between servers be encrypted for the purpose of copyright protection of video contents. As used herein, to "move" refers to a particular type of transfer process in which whenever the digital data of a program recorded is transferred from one storage device (e.g., a hard disk drive) to the other storage device (e.g., an optical disk drive), the digital data is automatically erased from the source. Meanwhile, Japanese Laid-Open Publication No. 13-76464 discloses a system in which if such data that was moved from a hard disk drive to an optical disk drive needs to be returned to the original storage device (i.e., the hard disk drive), that data is returned to its original storage location on the hard disk, thereby maintaining original data access information substantially (i.e., just as if that data had not been moved at all).

However, the storage capacities of the two storage media, between which the data should be moved, are not necessarily equal to each other. Nor are the processing capabilities of the two different systems to control the same storage medium, either. For that reason, before data is moved, that data may need to be down-converted. For example, a DVD drive does not support digital audiovisual data of a high definition (HD) resolution. Accordingly, if digital audiovisual data of an HD resolution and of a size of 20 GB, which is now stored on a hard disk, is moved to a single DVD with a storage capacity of 4.7 GB, then the amount of data should be cut down by down conversion. In that case, the data that has been moved to the DVD now should have a standard definition (SD) resolution. As used herein, the "down conversion" means generating data of a smaller size from original data by compressing the original data.

However, the user should know that the DVD drive cannot accept data of such a high resolution. Thus, there is no problem even if the image quality deteriorates to some extent as a result of the move. Nevertheless, if the user wanted to play back the digital audiovisual data, which has now moved to the DVD, at the original HD resolution again, then that should be a problem. This is because the digital audiovisual data, which used to be stored on the hard disk, has already been deleted and the digital audiovisual data currently stored on the DVD now has just a SD resolution as a result of the down conversion.

That is to say, in the prior art, once digital audiovisual data has been down converted as a result of a move, that digital audiovisual data can never be played back at the original resolution.

SUMMARY OF THE INVENTION

In order to overcome the problems described above, preferred embodiments of the present invention provide an data transfer system and program and a video server system, which can reconstruct original HD data even if down-converted data once moved is returned to its original location.

A data transfer system according to a preferred embodiment of the present invention is preferably used to transfer original data, which has been stored on a first data storage device, to a second data storage device. The transfer system preferably includes a compressor, an encryptor, and a controller. The compressor preferably receives the original data from the first data storage device, generates compressed data of a size smaller than the original data, and passes the compressed data to the second data storage device. The encryptor preferably makes a predetermined cryptographic key and passes the key to the second data storage device. The encryptor also receives the original data from the first data storage device, encrypts the original data with the cryptographic key and then sends the encrypted data back to the first data storage device. The controller preferably controls the compressor and the encryptor and preferably gives the first data storage device a first erase instruction, telling the first data storage device to erase the original data from itself, in accordance with a first transfer command.

In one preferred embodiment of the present invention, the data transfer system preferably further includes a decryptor, which receives the encrypted data and the cryptographic key from the first and second data storage devices, respectively, decrypts the encrypted data with the cryptographic key, and then sends the decrypted data back to the first data storage device. In accordance with a second transfer command, the controller preferably controls the decryptor and preferably gives the first data storage device a second erase instruction, telling the first data storage device to erase the encrypted data from itself, and the second data storage device a third erase instruction, telling the second data storage device to erase the compressed data and the cryptographic key from itself, respectively.

In this particular preferred embodiment, the data transfer system preferably further includes a timer for keeping time. Unless the controller receives the second transfer command within a predetermined period of time, as clocked by the timer, after having received the first transfer command, the controller preferably gives the first data storage device a fourth erase instruction telling the first data storage device to erase the encrypted data from itself.

In still another preferred embodiment, the cryptographic key is preferably passed to the second data storage device as a replacement for a portion of the compressed data.

In yet another preferred embodiment, the cryptographic key is preferably determined according to the compressed data.

In yet another preferred embodiment, the original data stored on the first data storage device may be digital data.

In an alternative preferred embodiment, the original data stored on the first data storage device may be audiovisual data.

In yet another preferred embodiment, the first data storage device is preferably a hard disk drive and the second data storage device is preferably an optical disk drive.

In yet another preferred embodiment, the compressor preferably decodes the original data that has been stored on the first data storage device and then encodes the decoded data at a higher compression rate than that of the original data.

A video server system according to a preferred embodiment of the present invention preferably includes a first server and a second server. The first server preferably includes a receiver, an encryptor, and a first data storage device. The receiver preferably receives a broadcast. The encryptor preferably generates encrypted data by making a predetermined cryptographic key and by encrypting data about the broadcast, received at the receiver, with the cryptographic key. The first data storage device preferably stores the encrypted data. The first server preferably transmits the data about the broadcast that has been received at the receiver and the cryptographic key over a network. The second server preferably includes a second data storage device for storing data thereon, is preferably connected to the network, and preferably stores the data and the cryptographic key, which have been transmitted from the first server, on the second data storage device.

In one preferred embodiment of the present invention, the first server preferably further includes a decoder, which receives the cryptographic key, which has been stored on the second data storage device, from the second server and decodes the encrypted data, which is stored on the first data storage device, with the cryptographic key.

A data transfer program according to a preferred embodiment of the present invention is preferably used to transfer original data, which has been stored on a first data storage device, to a second data storage device. The program preferably includes the steps of: (a) receiving the original data from the first data storage device, generating compressed data of a size smaller than the original data, and passing the compressed data to the second data storage device; (b) making a predetermined cryptographic key and passing the key to the second data storage device; (c) receiving the original data from the first data storage device, encrypting the original data with the cryptographic key and sending the encrypted data back to the first data storage device; and (d) giving the first data storage device a first erase instruction, telling the first data storage device to erase the original data from itself.

In one preferred embodiment of the present invention, the data transfer program preferably further includes the steps of: (e) receiving the encrypted data and the cryptographic key from the first and second data storage devices, respectively, and decrypted the encrypted data with the cryptographic key; (f) sending the decoded data back to the first data storage device; (g) giving the first data storage device a second erase instruction, telling the first data storage device to erase the encrypted data from itself; and (h) giving the second data storage device a third erase instruction, telling the second data storage device to erase the compressed data and the cryptographic key from itself.

In another preferred embodiment, the data transfer program preferably further includes the step of (i) giving the first data storage device a fourth erase instruction telling the first data storage device to erase the encrypted data from itself after a predetermined period of time has passed since the step (d) was performed.

In still another preferred embodiment, the step (b) preferably includes the step of passing the cryptographic key to the second data storage device as a replacement for a portion of the compressed data.

In yet another preferred embodiment, the step (b) preferably includes the step of determining the cryptographic key according to the compressed data.

In yet another preferred embodiment, the step (a) may include the step of receiving digital data from the first data storage device.

In an alternative preferred embodiment, the step (a) may include the step of receiving audiovisual data from the first data storage device.

In yet another preferred embodiment, the first data storage device is preferably a hard disk drive and the second data storage device is preferably an optical disk drive.

In yet another preferred embodiment, the step (a) preferably includes the step of decoding the original data that has been stored on the first data storage device and then encoding the decoded data at a higher compression rate than that of the original data.

According to various preferred embodiments of the present invention described above, even if some data is repeatedly transferred back and forth between two devices and subjected to compression in the meantime, the quality of the original data can still be intact. Consequently, data of any size can be transferred so as to fill the user's need while being subjected to an appropriate management procedure.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Embodiment 1

Figure 1:
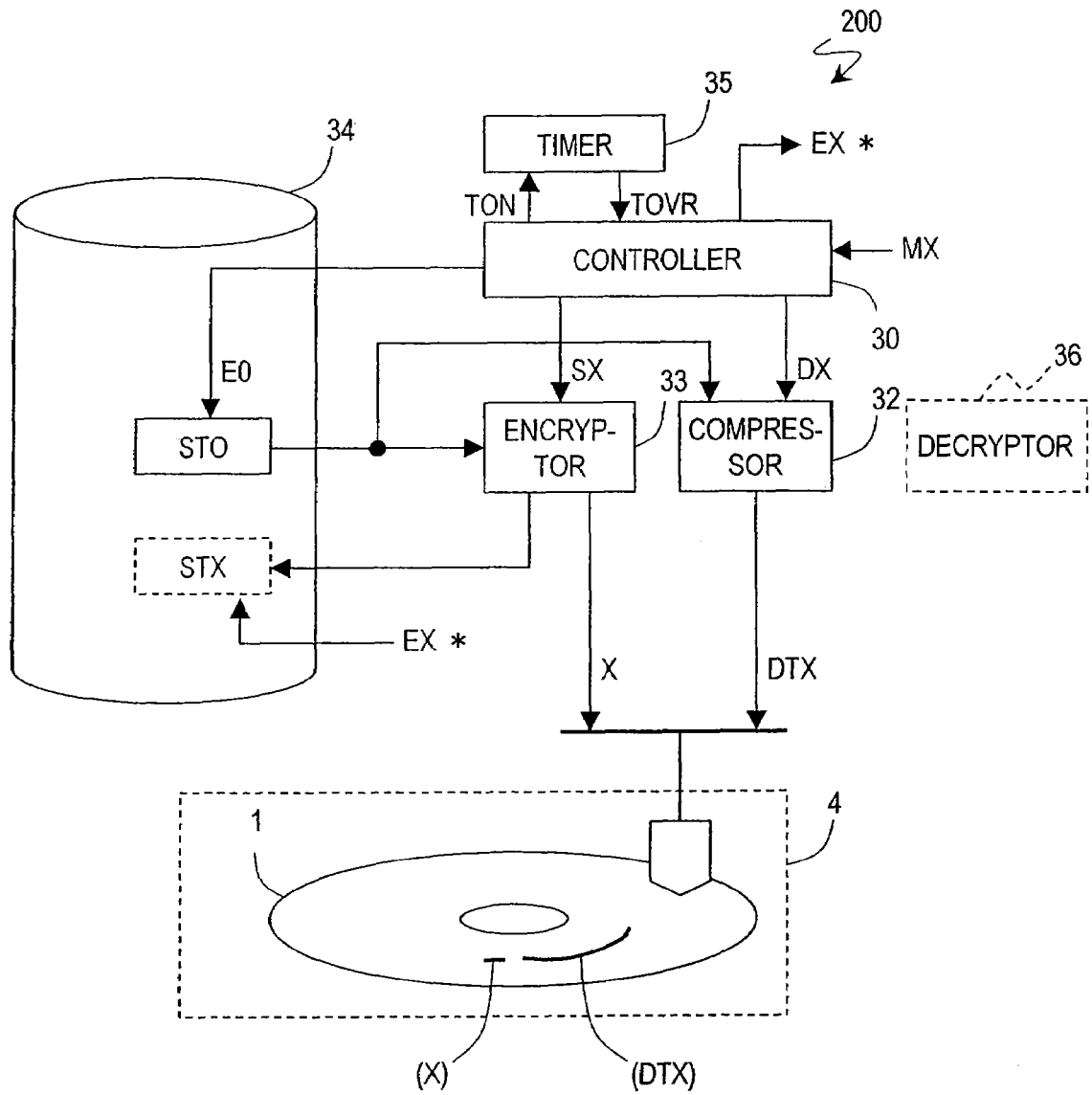
FIG. 1 is a block diagram illustrating a configuration for a data transfer system according to a first specific preferred embodiment of the present invention and showing how the system transfers data from a first data storage device to a second data storage device.

FIG. 1 is a block diagram showing a configuration for a data transfer system 200 according to a first specific preferred embodiment of the present invention. The data transfer system 200 may receive data from a first data storage device 34 and transfer it to a second data storage device 4. The first data storage device 34 may be a hard disk drive or the like, for example, and preferably has a relatively large storage capacity. On the other hand, the second data storage device 4 may be an optical disk drive with an optical disk, a memory card with a nonvolatile memory, or a hard disk drive with a relatively small storage capacity. In this preferred embodiment, the second data storage device 4 is supposed to be an optical disk drive. In any case, the first and second data storage devices 34 and 4 are preferably able to at least write data on a storage medium and protect the stored data such that the data can neither be erased nor read. As used herein, to "erase data" means making data written on a storage medium unreadable or unplayable. Also, the first and second data storage devices 34 and 4 are preferably "rewritable" ones that allow the user to alter the data once written there. Optionally, in each of the first and second data storage devices 34 and 4, the storage medium to store the data thereon may be removable. In this preferred embodiment, the first data storage device 34 is preferably a hard disk drive, while the second data storage device 4 is preferably an optical disk drive to be loaded with a rewritable optical disk 1.

Any of various types of digital data, including computer data and programs, audio data, video data and audiovisual data, may be transferred by the data transfer system 200. The data transfer system 200 transfers data after having compressed it, and therefore, can process audiovisual data, the size of which may change significantly according to the specific application, just as intended. In this preferred embodiment, audiovisual data ST0 that was digitized so as to comply the HD standard is stored on the first data storage device 34.

As shown in FIG. 1, the data transfer system 200 preferably includes a controller 30, a compressor 32 and an encryptor 33. In accordance with various instructions, the controller 30 controls the compressor 32 and the encryptor 33. Also, the controller 30 issues an instruction that tells the first or second data storage device 34 or 4 to erase the data stored there. The compressor 32 receives the data that has been stored on the first data storage device 34, generates compressed data of a smaller size (which will also be referred to herein as "down conversion") and then passes the compressed data to the second data storage device 4. The encryptor 33 makes a predetermined cryptographic key and passes it to the second data storage device 4. Also, the encryptor 33 receives the data from the first data storage device 34, encrypts the data with the cryptographic key and then sends the encrypted data back to the first data storage device 34. The controller 30 may be implemented as a microprocessor. Also, these instructions issued by the controller 30 and the control of the compressor 32 and encryptor 33 may be carried out in accordance with a program.

The data transfer system 200 preferably further includes a decryptor 36 for transferring the compressed data from the second data storage device 4 to the first data storage device 34. As will be described in detail later with reference to FIG. 2, the decryptor 36 receives the encrypted data and cryptographic key from the first and second data storage devices 34 and 4, respectively, and decrypts the encrypted data with the cryptographic key. Also, the decryptor 36 sends the decrypted data back to the first data storage device 34.

Hereinafter, it will be described in detail with reference to FIG. 1 how the data transfer system 200 transfers data from the first data storage device 34 to the second data storage device 4.

As shown in FIG. 1, the audiovisual data ST0 that was digitized so as to comply the HD standard is stored on the first data storage device 34. The controller 30 preferably performs the following processing in accordance with a move command MX that has been entered externally.

First, the controller 30 issues a compression execute instruction DX to the compressor 32. In accordance with this instruction DX, the compressor 32 receives the data ST0 from the first data storage device 34 and generates data DTX of a smaller size that the data ST0 originally stored on the first data storage device 34. In this preferred embodiment, the compressor 32 converts the HD compliant data ST0 into the SD compliant data DTX by a re-encoding method. More specifically, first, the compressor 32 decodes the data ST0 into decompressed data. Next, the compressor 32 encodes this decoded data again at a higher compression rate, thereby converting it into the SD compliant data DTX. Alternatively, the compressor 32 may convert the data ST0 by any other method or algorithm as long as the compressor 32 can cut down the size of the original data ST0. For example, if the data originally stored on the first data storage device 34 is SD compliant audiovisual data, then the compressor 32 may transcode that data into SD compliant audiovisual data at a lower bit rate than the data originally stored on the first data storage device 34.

The controller 30 also issues an encryption execute instruction SX to the encryptor 33. In accordance with this instruction SX, the encryptor 33 receives the data ST0 from the first data storage device 34, makes a cryptographic key X and encrypts the data ST0 with the cryptographic key X, thereby generating encrypted data STX. The cryptographic key X and encrypted data STX generated in this manner are passed to the second and first data storage devices 4 and 34, respectively, so as to be stored there.

The encryptor 33 may encrypt the data ST0 by scrambling the data ST0 using an appropriate cryptographic key X as a basis. Alternatively, the encryption may also be done by DES (Data Encryption Standard) or AES (Advanced Encryption Standard). The cryptographic key X is passed along with the compressed data DTX to the optical disk drive 4, where the built-in read/write head saves the key X and the data DTX on the optical disk 1.

Figure 3:
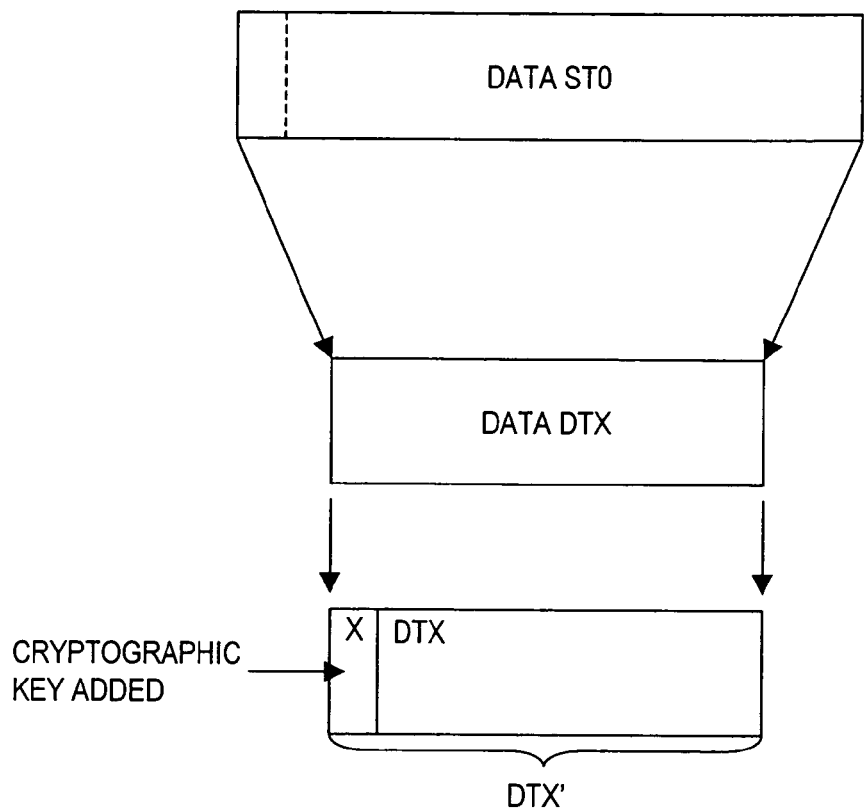
FIG. 3 is a schematic representation showing how to save an cryptographic key X and compressed data DTX.

FIG. 3 shows an exemplary format for storing the cryptographic key X and the data DTX. In writing the cryptographic key X and the data DTX, respective areas for storing the cryptographic key X and the data DTX may be provided on the optical disk 1 in the second data storage device 4. However, if either the second data storage device 4 or the optical disk 1 were not compatible with such a method that reserves a dedicated area for the cryptographic key X, then the cryptographic key X and the data DTX might be stored inappropriately. Thus, in this preferred embodiment, a method of writing the cryptographic key X on the optical disk 1 while accepting the conventional optical disk writing method is adopted.

As shown in FIG. 3, the data ST0 originally stored on the first data storage device 34 is compressed, thereby generating the compressed data DTX. Next, a portion of the compressed data DTX is replaced with the cryptographic key X to obtain composite data DTX' as one file. Then, this composite data DTX' is stored on the optical disk 1 in the second data storage device 4. The cryptographic key X preferably substitutes for a top portion of the compressed data DTX. According to this method, the composite data DTX' is no different from the conventional format for the second data storage device 4 and optical disk 1, and therefore, the data can be read from, and written on, the optical disk 1 just as intended. Also, on receiving such composite data DTX', the data transfer system 200 can extract the cryptographic key X from the top of the composite data DTX' correctly.

If the second data storage device 4 plays the optical disk 1 on which the composite data DTX' is stored, then the cryptographic key X will be played back as a piece of video data, and video with noise will be displayed, just briefly after the composite data DTX' has started being played back. This is because the second data storage device 4 cannot accept the cryptographic key X. However, since the data size of the cryptographic key X is much smaller than that of the video data, the noise will appear for a very short time if ever. Accordingly, there is hardly any perceivable difference between the video obtained by reading the composite data DTX' and the video obtained by reading the compressed data DTX.

The cryptographic key X may be made by various methods. For example, the encryptor 33 may generate random numbers and use them as the cryptographic key X. Alternatively, the cryptographic key X may also be produced based on date, time, or any other suitable information. As another alternative, the first several bits of the compressed data DTX themselves may be used as the cryptographic key X. In that case, the composite data DTX' is identical with the compressed data DTX except the first several bits as the cryptographic key X. Then, the second data storage device 4 having the same configuration as the conventional one can read the composite data DTX' correctly. In using the first several bits as the cryptographic key X, the cryptographic key X is uniquely determined by algorithms for the original data ST0 and compressor 32. Even so, actually no serious problems would arise because the original data ST0 or the compressed data DTX is the contents of a broadcast program and because the first several bits thereof change from one program to another. Also, if the first data storage device 34 is designed so as not to transfer the encrypted data STX once stored there, then the data can be managed even more appropriately.

After the compressed data DTX and cryptographic key X have been saved on the second data storage device 4 and the encrypted data STX has been saved on the first data storage device 34, the controller 30 issues an erase instruction E0 to the first data storage device 34. In accordance with this instruction E0, the original data ST0 is erased.

By performing these processing steps, the transfer of the original data ST0 from the first data storage device 34 to the second data storage device 4 is completed. The encrypted data STX could not be properly decrypted into meaningful data without the cryptographic key X, which is retained, along with the compressed data DTX, nowhere but on the second data storage device 4 as its destination. Accordingly, the original data ST0 has virtually been deleted from the first data storage device 34 and can be regarded as having been moved substantially. That is to say, the original data ST0 has been shifted from the first data storage device 34 to the second data storage device 4 with no copy of the original left on the first data storage device 34.

It should be noted that even if the data has been transferred from the first data storage device 34 to the second data storage device 4 by performing these processing steps, the encrypted data is still left on the first data storage device 34. That is to say, every time the data transfer system 200 "moves" the data, encrypted data will be newly accumulated on the first data storage device 34, thus decreasing the available storage capacity of the first data storage device 34 gradually. If this is a problem, then the data transfer system 200 may include a timer 35 such that the encrypted data is deleted automatically when the timer 35 tells that a predetermined amount of time has passed since that data was saved. More specifically, on receiving a start instruction TON from the controller 30, the timer 35 starts clocking time. The timing for the controller 30 to issue the start instruction TON may be associated with the timing of issuing the move command MX described above or posterior to the storage of the encrypted data STX on the first data storage device 34. In any case, when a predetermined amount of time has passed, the timer 35 will output a signal TOVR to the controller 30. In response to this signal TOVR, the controller 30 gives the first data storage device 34 an instruction EX that tells the first data storage device 34 to erase the encrypted data STX. As a result, the old encrypted data STX is deleted and the available storage capacity of the first data storage device 34 increases. In this case, the "predetermined amount of time" may be set to around one week or two, for example. This is because unless the user performs a "backward move" in more than one week, he or she seems to have an intention to permanently save the compressed data DTX that has been moved to the second data storage device 4. However, this is just an example, and the timing to delete the encrypted data STX from the first data storage device 34 may be determined from various other points of view.

Figure 2:
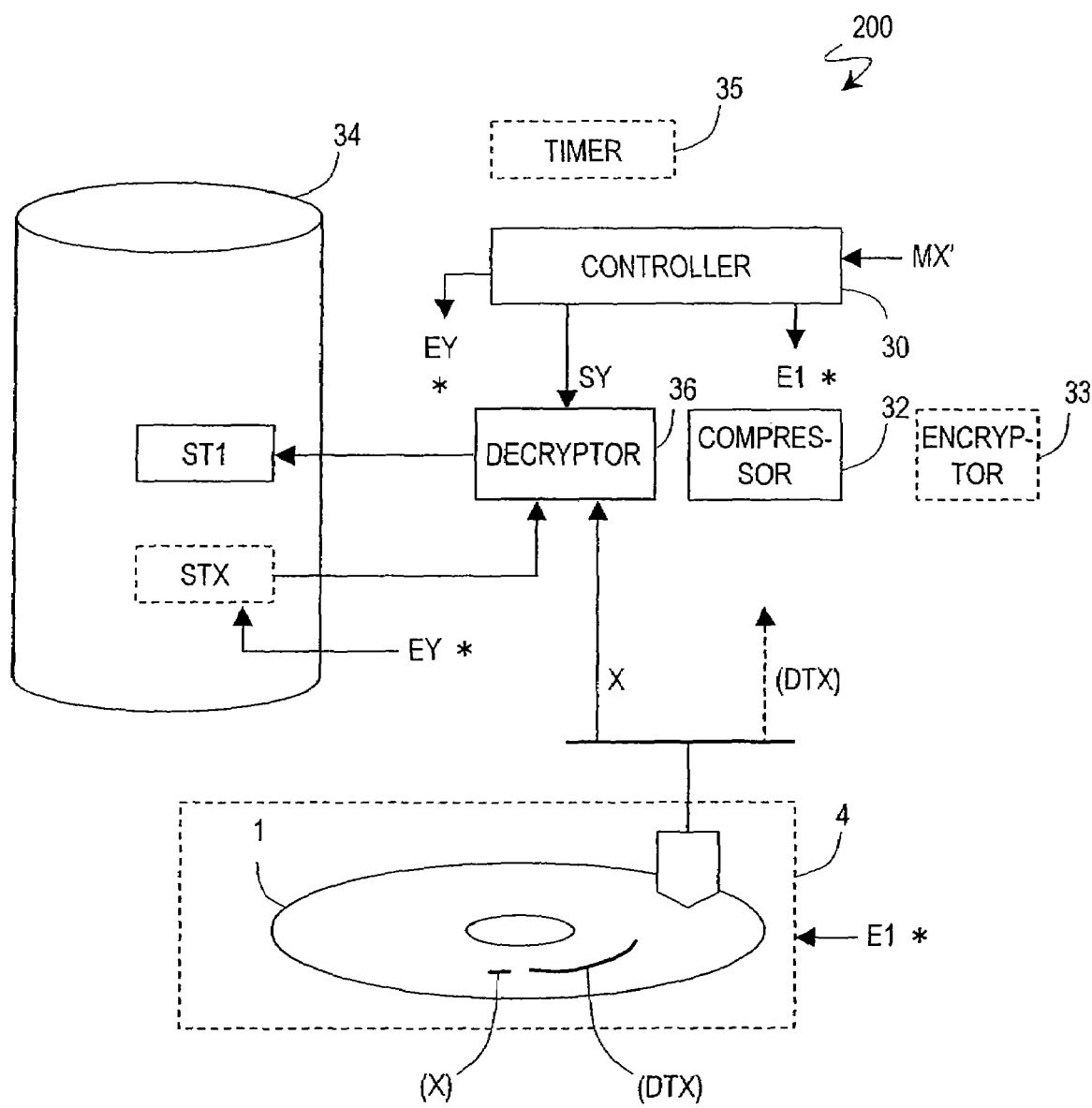
FIG. 2 is a block diagram showing how the system shown in FIG. 1 transfers data from the second data storage device to the first data storage device in the first preferred embodiment of the present invention.

Next, it will be described with reference to FIG. 2 how to transfer the compressed data DTX on the second data storage device 4 back to the first data storage device 34. This is what we call the "backward move" operation.

In accordance with a backward move command MX' externally entered, the controller 30 performs the following processing steps. First, the controller 30 issues a decrypt instruction SY to the decryptor 36. In response, the decryptor 36 retrieves the cryptographic key X from the second data storage device 4. However, unless the second data storage device 4 has adopted a method of saving the cryptographic key X in a particular area, the second data storage device 4 cannot give up the cryptographic key X by itself. In that case, either the overall composite data DTX', obtained by embedding the cryptographic key X in the compressed data DTX, or data stored in a predetermined top area that should include the cryptographic key X is output from the second data storage device 4. Accordingly, the decryptor 36 uses only the cryptographic key X and discards the compressed data DTX in that situation.

The decryptor 36 also receives the encrypted data STX from the first data storage device 34 and decrypts the encrypted data STX with the cryptographic key X, thereby generating decrypted data ST1, which is then stored back on the first data storage device 34. The decrypted data ST1 has the same data size, and complies with the same HD standard, as the original data ST0. The controller 30 issues an erase instruction EY to the first data storage device 34. In accordance with this instruction EY, the encrypted data STX is erased from the first data storage device 34. The controller 30 also issues another erase instruction E1 to the second data storage device 4. In accordance with this instruction E1, the compressed data DTX and cryptographic key X are erased from the second data storage device 4. In this manner, the compressed data DTX that has been stored on the second data storage device 4 is transferred to the first data storage device 34. That is to say, since the compressed data DTX has been erased from the second data storage device 4, the compressed data DTX has virtually been shifted from the second data storage device 4 to the first data storage device 34 with no copy of the original left on the second data storage device 4. In other words, the "backward move" is completed. Also, as a result of this transfer, the decompressed (decrypted) data ST1 is generated from the compressed data DTX, thus achieving "up conversion".

As described above, according to this preferred embodiment, data can be virtually moved from one storage location to another without missing any part of it, although the transfer process involves compression or down conversion. In addition, the move never leaves the same available data in more than one location (i.e., with no duplicated data left in its original location). Consequently, the saved data can be managed highly appropriately and efficiently.

The data transfer system 200 of this preferred embodiment may be implemented in various manners. For example, a single information appliance, including the first and second data storage devices 34 and 4 and the data transfer system 200 within the same housing, may be provided. More specifically, the preferred embodiment described above is applicable for use in a DVD recorder/player including a hard disk drive and a DVD drive as its built-in components. Alternatively, a telecommunications system may be constructed by connecting together the first and second data storage devices 34 and 4 and the data transfer system 200 over a network.

Embodiment 2

Figure 4:
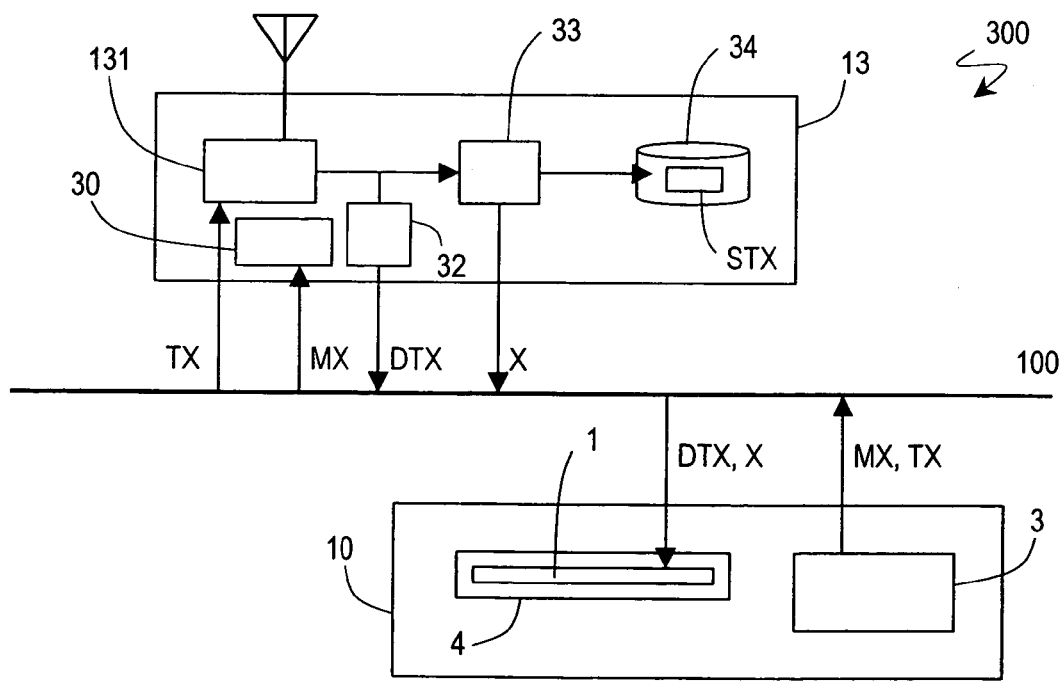
FIG. 4 is a block diagram showing a configuration for a video server system according to a second specific preferred embodiment of the present invention.

FIG. 4 is a block diagram showing a configuration for a video server system 300 according to a preferred embodiment of the present invention. The video server system 300 includes servers 10 and 13, which are connected together over a network 100 so as to establish a telecommunications link between them. In the example shown in FIG. 4, in accordance with an instruction issued by the server 10, the server 13 receives a broadcast program and transmits the audiovisual data of the broadcast program to the server 10 over the network 100. In this video server system 300, each component having the same function as the counterpart of the data transfer system 200 of the first preferred embodiment described above is identified by the same reference numeral. As shown in FIG. 4, the server 10 includes a controller 3 and the second data storage device 4, while the server 13 includes the controller 30, the compressor 32, the encryptor 33, the first data storage device 34 and a tuner 131.

The controller 3 of the server 10 sends not only a move command MX but also program reservation information TX to the server 13. The program reservation information TX includes channel number, start and end times of the reserved program and transfer rate. In accordance with the program reservation information TX, the controller 30 starts receiving the designated program using the tuner 131. If the transfer rate of the program being received by the tuner 131 of the server 13 (e.g., 22 Mbps according to the HD standard) is higher than that demanded by the server 10 (e.g., 8 Mbps according to the SD standard), then the data of the received program is compressed by the compressor 32 and supplied as the compressed data DTX to the server 10. The transfer rate is correlated to the image quality of a program. That is to say, the higher the definition of the image being transferred, the higher the transfer rate of the program should be. The transfer rate demanded by the server 10 should be acceptable for either the second data storage device 4 or the optical disk 1 loaded in the second data storage device 4. The compression is needed if either the optical disk 1 or the second data storage device 4 is compliant with only the SD standard requiring a transfer rate of 8 Mbps or less or if the optical disk 1 or second data storage device 4 can cope with a high transfer rate but the user has designated a lower transfer rate to make a long-hour recording.

In this case, to store the data of the received program on the second data storage device 4, the HD compliant data of the received program should be compressed. However, the server 10 does not always include a compressor for compressing the data. Thus, if the server 10 has no compressors, the data needs to be compressed by the server 13. Nevertheless, the broadcast program received at the server 13 may allow only a move, not the backward move. In such a situation, once the server 13 has compressed the data of that program, the program must be played back in no higher than the SD quality.

Thus, in the server 13 of this preferred embodiment, the data of the program received at the tuner 131 is compressed by the compressor 32 so as to comply with the SD standard (with a transfer rate of 8 Mbps). The resultant compressed data DTX is output to the network 100. In the meantime, the data of the received program is also encrypted by the encryptor 33 so as to still comply with the HD standard (with a transfer rate of 22 Mbps), and the encrypted data STX is stored on the first data storage device 34 of the server 13. In this case, the cryptographic key X made by the encryptor 33 during the encryption, along with the compressed data DTX, is saved on the second data storage device 4 over the network 100. The method and procedure of writing may be the same as those already described for the first preferred embodiment.

In this manner, the server 13 compresses the data of the broadcast program received at the tuner 131 and transmits the compressed data DTX to the second data storage device 4. Meanwhile, the server 13 also encrypts the data of the received program and stores the encrypted data STX on the first data storage device 34. This situation is equivalent to the "move" as described for the first preferred embodiment except that the data of the broadcast program has not been saved on the first data storage device 34 in the beginning.

If the user wants to view this program in the original HD quality, simply the cryptographic key X needs to be transmitted from the second data storage device 4 of the server 10 to the server 13. Then, the "backward move" operation will be carried out just as already described for the first preferred embodiment. As a result, the original HD compliant data of that program will be reconstructed on the first data storage device 34.

It should be noted that the "cryptographic key X" of the second preferred embodiment may be the same as that of the first preferred embodiment and does not refer to a key that has already been added by a broadcaster or a contents provider (e.g., CPRM). The cryptographic key X is defined and used only between these two servers 13 and 10. Accordingly, the cryptographic key X may be arbitrarily made by the server 13.

As described above, the second preferred embodiment of the present invention provides a distributed video server system that can move the data of a received program without missing any part of it even if down conversion must be done between servers.

In the first and second preferred embodiments of the present invention described above, audiovisual data is supposed to be transferred. However, even after any other higher-quality data or data of a bigger size has been transferred as lower-quality data or data of a smaller size (i.e., as compressed data), the present invention can also be used effectively in a system for reconstructing that lower-quality or smaller size data into the original higher-quality or bigger size data.

Also, in the preferred embodiments described above, the cryptographic key X is supposed to be transferred along with the compressed data DTX. However, if there is no need to save the cryptographic key X with the compressed data DTX (i.e., if the key X and the data DTX just need to be associated with each other), then the key X and the data DTX do not have to be transferred simultaneously.

Various preferred embodiments of the present invention described above are effectively applicable for use in various types of data transfer systems, distributed video server systems, optical disk recorders with built-in HDD, and a home AV server including multiple recorders, if the data to be transferred should be down converted.

This application is based on Japanese Patent Applications No. 2003-358666 filed on Oct. 20, 2003, No. 2003-365652 filed on Oct. 27, 2003 and No. 2004-299749 filed on Oct. 14, 2004, the entire contents of which are hereby incorporated by reference.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A data transfer system for transferring original data, which has been stored on a first data storage device, to a second data storage device, the transfer system comprising:
    a compressor, which receives the original data from the first data storage device, generates compressed data of a size smaller than the original data, and passes the compressed data to the second data storage device;
    an encryptor which makes a predetermined cryptographic key, passes the key to the second data storage device, receives the original data from the first data storage device, encrypts the original data with the cryptographic key and then sends the encrypted data back to the first data storage devie;
    a decryptor, which receives the encrypted data from the first data storage device, the cryptographic key from the second data storage device, decrypts the encrypted data with the cryptographic key, and then sends the decrypted data back to the first data storage device; and
    a controller which controls the compressor and the encryptor,
    wherein, in accordance with a first transfer command to transfer the original data from the first data storage device to the second data storage device, said controller controls the compressor to compress the original data on the first data storage device and pass the compressed data to the second data storage device, controls the encryptor to encrypt the original data on the first data storage device and send the encrypted data to the first data storage device and thereafter, gives the first data storage device a first erase instruction telling the first data storage device to erase the original data from itself, and
    wherein, in accordance with a second transfer command to restore the original data on the first data storage device, the controller controls the decryptor to decrypt the encrypted data on the first data storage device and thereafter gives the first data storage device a second erase instruction telling the first data storage device to erase the encrypted data from itself, and the second data storage a third erase instruction, telling the second data storage device to erase the compressed data and the cryptographic key from itself, respectively.

2. The data transfer system of claim 1, further comprising a timer for keeping time,
    wherein unless the controller receives the second transfer command within a predetermined period of time, as clocked by the timer, after having received the first transfer command, the controller gives the first data storage device a fourth erase instruction, telling the first data storage device to erase the encrypted data from itself.

3. The data transfer system of claim 1, wherein the cryptographic key is passed to the second data storage device wherein the cryptographic key replaces a portion of the compressed data.

4. The data transfer system of claim 1, wherein the cryptographic key is determined according to the compressed data.

5. The data transfer system of claim 1, wherein the original data stored on the first data storage device is digital data.

6. The data transfer system of claim 1, wherein the original data stored on the first data storage device is audiovisual data.

7. The data transfer system of claim 1, wherein the first data storage device is a hard disk drive and the second data storage device is an optical disk drive.

8. The data transfer system of claim 1, wherein the compressor decodes the original data that has been stored on the first data storage device into decompressed data and then encodes the decoded data at a higher compression rate than that of the original data.

9. A video server system comprising:
    a receiver for receiving a broadcast;
    a compressor which receives the broadcast from the receiver and generates compressed data of a size smaller than the broadcast;
    an encryptor which generates encrypted data by making a predetermined cryptographic key and by encrypting the broadcast with the cryptographic key;
    a first data storage device which stores the encrypted data;
    a decryptor; and
    a controller, and
    a second server, which includes a second data storage device, said second server being connected to the network, and storing compressed data and the cryptographic key on the second data storage device;
    wherein, in accordance with a first transfer command to transfer the broadcast from the first data storage device to the second data storage device, said controller controls the compressor to compress the broadcast on the first data storage device and pass the compressed data to the second data storage device, controls the encryptor to encrypt the broadcast on the first data storage device and send the encrypted data to the first data storage device and thereafter, gives the first data storage device a first erase instruction telling the first data storage device to erase the broadcast from itself, and wherein, in accordance with a second transfer command to restore the broadcast on the first data storage device, the controller controls the decryptor to decrypt the encrypted data on the first data storage device and thereafter gives the first data storage device a second erase instruction telling the first data storage device to erase the encrypted data from itself, and the second storage a third erase instruction, telling the second data storage device to erase the compressed data and the cryptographic key from itself, respectively.

10. A computer program embodied in a computer readable media for transferring original data, which has been stored on a first data storage device, to a second data storage device, the program comprising the steps of:

(a) receiving the original data from the first data storage device, generating compressed data of a size smaller than the original data, and passing the compressed data to the second data storage device;

(b) making a predetermined cryptographic key and passing the key to the second data storage device;

(c) receiving the original data from the first data storage device, encrypting the original data with the cryptographic key and sending the encrypted data back to the first data storage device; and (d) giving the first data storage device a first erase instruction, telling the first data storage device to erase the original data from itself;

(e) receiving the encrypted data and the cryptographic key from the first and second data storage devices, respectively, and decoding the encrypted data with the cryptographic key;

(f) sending the decrypted data back to the first data storage device;

(g) giving the first data storage device a second erase instruction, telling the first data storage device to erase the encrypted data from itself; and (h) giving the second data storage device a third erase instruction, telling the secind data storage device to erase the compressed data and the cryptographic key from itself.

11. The data transfer program of claim 10, further comprising the step of (i) giving the first data storage device a fourth erase instruction telling the first data storage device to erase the encrypted data from itself after a predetermined period of time has passed since the step (d) was performed.

12. The data transfer program of claim 10, wherein the step (b) includes the step of passing the cryptographic key to the second data storage device as a replacement for a portion of the compressed data.

13. The data transfer program of claim 10, wherein the step (b) includes the step of determining the cryptographic key according to the compressed data.

14. The data transfer program of claim 10, wherein the step (a) includes the step of receiving digital data from the first data storage device.

15. The data transfer program of claim 10, wherein the step (a) includes the step of receiving audiovisual data from the first data storage device.

16. The data transfer program of claim 10, wherein the first data storage device is a hard disk drive and the second data storage device is an optical disk drive.

17. The data transfer program of claim 10, wherein the step (a) includes the step of decoding the original data that has been stored on the first data storage device into decompressed data and then encoding the decoded data at a higher compression rate than that of the original data.

* * * * *

UNITED STATES PATENT AND TRADEMARK OFFICE
CERTIFICATE OF CORRECTION

PATENT NO.        : 7,467,412 B2
APPLICATION NO.   : 10/968601
DATED             : December 16, 2008
INVENTOR(S)       : Hiromichi Ishibashi et al.

It is certified that error appears in the above-identified patent and that said Letters Patent is hereby corrected as shown below:

Column 11, line 57:
"devie" should read -- device --;

Column 12, line 17:
After "age", insert -- device --;

Column 14, line 7:
"secind" should read -- second --.

Signed and Sealed this

Twelfth Day of May, 2009

JOHN DOLL
*Acting Director of the United States Patent and Trademark Office*